O. FOBES.
MOTOR CYCLE STARTER.
APPLICATION FILED APR. 8, 1915.

1,172,969.

Patented Feb. 22, 1916.
2 SHEETS—SHEET 1.

Witnesses

Inventor
Oliver Fobes
By H. R. Wilson & Co
Attorney

O. FOBES.
MOTOR CYCLE STARTER.
APPLICATION FILED APR. 8, 1915.
1,172,969.
Patented Feb. 22, 1916.
2 SHEETS—SHEET 2.
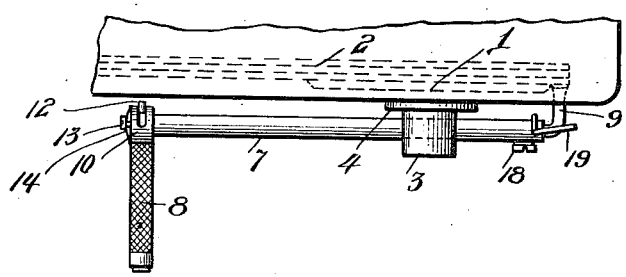
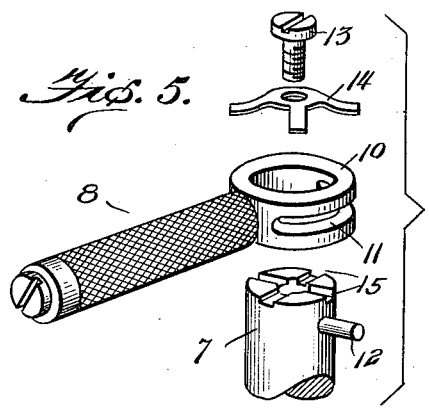
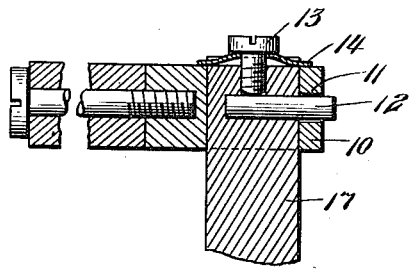
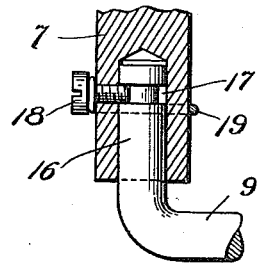
Inventor
Oliver Fobes
Witnesses

UNITED STATES PATENT OFFICE.

OLIVER FOBES, OF NEW CASTLE, PENNSYLVANIA.

MOTOR-CYCLE STARTER.

1,172,969.     Specification of Letters Patent.     Patented Feb. 22, 1916.

Application filed April 8, 1915. Serial No. 20,009.

*To all whom it may concern:*

Be it known that I, OLIVER FOBES, a citizen of the United States, residing at New Castle, in the county of Lawrence and State of Pennsylvania, have invented certain new and useful Improvements in Motor-Cycle Starters; and I do declare the following to be a full, clear, and exact description of the invention, such as will enable others skilled in the art to which it appertains to make and use the same.

This invention relates to starters for motors and more particularly to motorcycle starters.

The object of the invention is to provide a simply constructed and efficient motor starter for chain driven vehicles and particularly for chain driven motorcycles having a pedal crank shaft running through a clutch counter-shaft.

Another object is to provide a starter of this class of vehicles constituting a crank actuated pawl positioned to engage the driving chain and thereby turn the clutch sprocket a sufficient distance to start the motor.

With these and other objects in view, the invention consists of certain novel features of construction, and the combination and arrangement of parts as will be more fully described and claimed.

Figure 1:
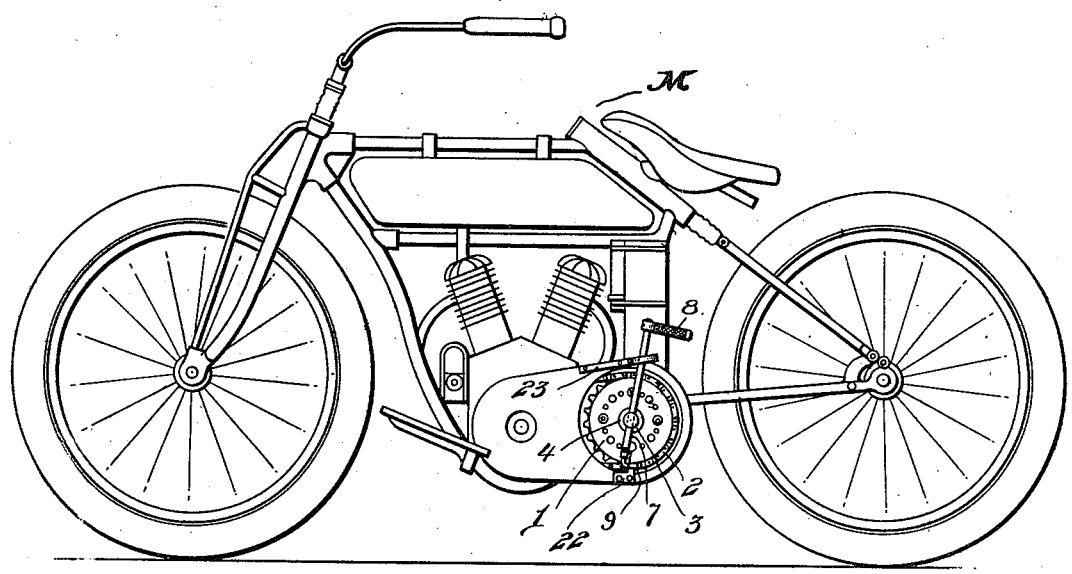
Figure 2:
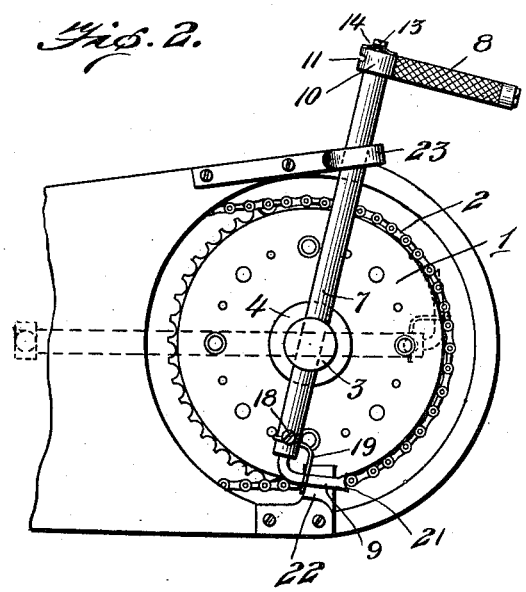
Figure 3:
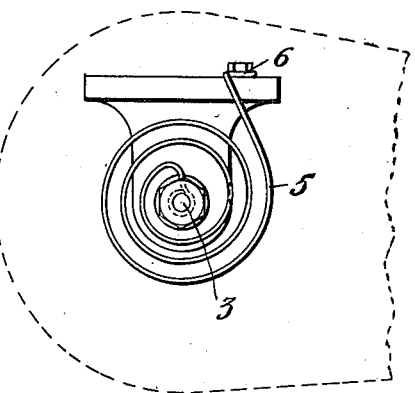

In the accompanying drawings: Figure 1 is a side elevation of a motor cycle equipped with this improved starter. Fig. 2 is an enlarged detail side elevation of this improved starter showing the pedal crank in inoperative upright position in full lines and in the position assumed during the starting of the motor crank in dotted lines. Fig. 3 is a similar view taken from the other side of the machine and showing the spring for returning the pedal shaft and the crank connected therewith into inoperative position after it has been actuated. Fig. 4 is a plan view showing the pedal in the position assumed after depression thereof and is indicated in dotted lines in Fig. 2. Fig. 5 is a detail perspective view of the pedal and a portion of its crank showing the connections therefor with the parts arranged in juxtaposition ready for assembling. Fig. 6 is a longitudinal central section thereof with the parts in assembled position, a portion of the pedal being broken off for convenience in illustration. Fig. 7 is a detail perspective view of the actuating pawl with the spring for forcing it into engagement with the chain. Fig. 8 is a vertical section thereof with a portion of the pawl broken off.

In the embodiment illustrated a motorcycle M is shown in conventional form equipped with the usual clutch sprocket 1 having a driving chain 2 engaged therewith. A pedal shaft 3 is shown running through the clutch counter-shaft 4 and having a spiral spring 5 connected to one end thereof and to a fixed point 6 and which is designed to return the shaft 3 to normal position after it has been actuated, as will be hereinafter described. A pedal crank 7 is connected to the other end of the shaft 3 and extends on opposite sides thereof, one end of said crank having a folding pedal 8 connected thereto and the other end a pawl 9. The pedal 8 is connected with the crank 7 by a sleeve 10 having a peripherally extending slot 11 therein through which a pin 12 mounted in the crank 7 extends, said pin being designed to connect the pedal to the crank and the slot through which said pin projects permits the pedal to be turned at about ninety degrees. A headed bolt or set screw 13 extends longitudinally from the outer end of the crank 7 into an internally threaded socket provided in said end and passes through a spring 14 with its inner end engaging the pin 12 which intersects said socket and which serves to hold said pin in operative position. The spring 14 bears on the outer end of the sleeve 10 and provides a friction joint, said spring fitting in slots 15 formed in the outer end of the crank 7 to prevent said spring from turning.

The pawl 9 is shown of L-shaped construction with the short arm 16 thereof inserted in a socket 17 formed in the end of the crank 7 opposite to that which carries the pedal 8 and which is held in said socket by a screw 18 which also connects a spring 19 to said crank, said spring being here shown encircling said crank and bearing on the pawl 9 to force it laterally inward toward the chain 2. The long arm 20 of the pawl is provided at its free end with a biting or gripping member which is shown curved transversely as indicated at 21 to adapt it to conform to the shape of one end of one of the links of the chain 2 so that when said pawl is brought into engagement with said chain this gripping end will engage one end of one of the chain links and thus provide for the moving of the chain by the pawl on the turning of the crank 7 as will be hereinafter more fully described.

A block or plate 22 is mounted on the chain guard in position to engage the pawl 9 when the crank 7 is in normally inoperative position as is shown clearly in Fig. 1. A spring clamp 23 is mounted on the frame of the motorcycle or rear casing of the clutch sprocket at a point substantially opposite the block 22 and which is designed to engage the crank 7 of the pedal and hold said pedal in folded inoperative position as shown in Fig. 1, and when said crank is engaged by said clamp in the position shown, the plate 22 will be positioned under the pawl 9 and thus hold said pawl out of engagement with the chain 2 against the tension of the spring 19 to prevent said pawl from dragging on the chain when the motorcycle is in motion.

In the operation of this improved starter when the parts are in the position shown in Fig. 1 with the pedal 8 in upward folded position and the crank 7 engaged by the clamp 23, said pedal is pushed out at right angles to the machine and then forced downwardly a one-half turn which throws the motor of the machine over from one to two turns. Immediately the crank 7 passes out of the clasp 23 the pawl 9 drops off the block 22 and by means of the spring 19 is forced inwardly against the chain 2 and engages one end of one of the links of said chain, and when outward pressure is exerted on the pedal, this pawl together with the chain with which it is engaged is forced rearwardly, thereby turning the clutch sprocket 1 a one-half turn which operates to start the engine or motor. Immediately pressure is released on the pedal 8, the coiled spring 5 will operate to return it to its raised inoperative position, thereby causing the crank 7 to enter clamp 23 and the pawl 9 to ride over block 22 holding it out of engagement with the chain and the machine is ready for use. It is to be observed that this motorcycle may be started with both wheels resting on the ground as shown in Fig. 1, it not being necessary to hold the rear wheels suspended as is usual in wheels of this character when started.

While this improved starter is shown and described in connection with a motorcycle, it is obvious that it may be attached to any chain driven motors having a pedal crank shaft running through a clutch counter-shaft, and therefore it is not intended to limit this invention to the motorcycle.

I claim as my invention:

1. The combination with a motor having a driving chain; of a starter therefor including means under the control of the operator for engagement with said chain, and means for normally holding said chain engaging means out of engagement with the chain.

2. The combination with a motor having a clutch sprocket, a driving chain engaged therewith, chain engaging means, means for normally holding said chain engaging means out of engagement with the chain, and means for actuating said clutch sprocket to position it for operation, said means being also operable to actuate the chain engaging means, whereby the engine is started.

3. The combination with a motor having a clutch sprocket, a driving chain engaged therewith, chain engaging means, means for normally holding said chain engaging means out of engagement with the chain, means for actuating said clutch sprocket to position it for operation, said means being also operable to actuate the chain engaging means, whereby the engine is started, and means for automatically returning said actuating means to normal position.

4. The combination with a motor having a driving chain, of a starter therefor including a pawl for engagement with said chain and a crank for actuating said pawl, and means for normally holding said pawl out of engagement with said chain.

5. The combination with a motor having a driving chain, of a starter therefor including a pawl for engagement with said chain, a spring engaging said pawl and exerting its tension to force it into engagement with said chain, means for normally holding said pawl out of engagement with said chain against the tension of said spring, and a crank for actuating said pawl to release it from said holding means and to forcibly engage it with said chain.

6. The combination with a motor having a clutch sprocket, a driving chain engaged therewith, said clutch sprocket having a hollow counter-shaft, a pedal shaft extending through said counter-shaft, a crank fixed to one end of said pedal shaft intermediately of the ends of said crank, a pedal carried by one end of said crank and a pawl by the other end thereof, a spring mounted on said crank and engaging said pawl to force it laterally inward toward said chain, means for yieldably holding said crank in raised inoperative position, means for engaging said pawl to normally hold it out of engagement with said chain, said parts being so positioned that on the release of said crank from said holding means, said pawl will be brought into engagement with said chain.

7. A motorcycle starter including a pedal crank having a pin extending laterally from one end thereof, a pedal having a sleeve engaging said crank end and provided with a peripherally extending slot through which said pin projects, and means for holding said sleeve in frictional engagement with said crank.

8. A motorcycle starter including a pedal crank having a pin extending laterally from one end thereof, a pedal having a sleeve engaging said crank end and provided with a peripherally extending slot through which said pin projects, and a spring adjustably mounted on said crank end and engaging said sleeve to provide frictional contact between said sleeve and crank end.

9. A motorcycle starter including a pedal crank having a pin extending laterally from one end thereof, a pedal having a sleeve engaging said crank end and provided with a peripherally extending slot through which said pin projects, said crank end having slots therein, a spring mounted on said crank end in said slot and engaging said sleeve for forming a frictional joint between the sleeve and crank.

10. A motorcycle starter including a pedal crank having a pedal at one end and a pawl at the other, said pawl being L-shaped with one arm engaged with one end of said crank, and a spring secured to said crank and bearing on said pawl for forcing it laterally inward.

11. The combination with a motor having a driving chain, of a starter therefor including a pawl in engagement with said chain, means for engaging said pawl with said chain, and means for automatically returning said first-mentioned means to inoperative position for actuation.

12. The combination with a motor having a driving chain, of a starter therefor including a pawl for engagement with said chain, a crank for actuating said pawl, means for normally holding said crank in inoperative position, and means for returning said crank to said position after it has been operated.

13. The combination with a motor having a driving chain, of a starter therefor including a pawl for engagement with said chain, a crank for actuating said pawl, means for normally holding said crank in inoperative position, and a coiled spring for returning said crank to inoperative position after it has been actuated.

14. The combination with a motor having a driving chain, of a starter therefor comprising a revolubly mounted crank having a pedal at one end and a pawl at the other positioned for engagement with said chain, said pawl having a curved engaging end to adapt it to engage one end of one of the chain links, and means for normally holding said pawl out of engagement with said chain.

15. The combination with a motor having a clutch sprocket wheel with a hollow counter-shaft, a pedal shaft extending through said counter-shaft, a crank mounted on one end of said pedal shaft with its ends extending on opposite sides thereof, a pedal carried by one end of said crank and a pawl carried by the other, means for normally holding said pawl out of engagement with said chain, and a spring connected to the other end of the pedal shaft for returning said pawl and pedal to inoperative position after they have been actuated.

In testimony whereof I have hereunto set my hand in presence of two subscribing witnesses.

OLIVER FOBES.

Witnesses:
 V. W. HOYE,
 M. L. AILEY.